United States Patent
Nakahama

(10) Patent No.: US 11,119,208 B2
(45) Date of Patent: Sep. 14, 2021

(54) ECHO IMAGE GENERATING DEVICE

(71) Applicant: Furuno Electric Co., Ltd., Nishinomiya (JP)

(72) Inventor: Masahiro Nakahama, Sanda (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 209 days.

(21) Appl. No.: 16/446,659

(22) Filed: Jun. 20, 2019

(65) Prior Publication Data

US 2019/0391257 A1    Dec. 26, 2019

(30) Foreign Application Priority Data

Jun. 20, 2018 (JP) .............................. JP2018-117434

(51) Int. Cl.
*G01S 13/89* (2006.01)
*G01S 7/22* (2006.01)
*G01S 7/06* (2006.01)

(52) U.S. Cl.
CPC .............. *G01S 13/89* (2013.01); *G01S 7/062* (2013.01); *G01S 7/066* (2013.01); *G01S 7/22* (2013.01)

(58) Field of Classification Search
CPC ........ G01S 13/93; G01S 13/937; G01S 13/89; G01S 7/62; G01S 7/062; G01S 7/66; G01S 7/066; G01S 7/022; G01S 7/22; G01S 7/10; G01S 7/01; G01S 7/292; G01S 7/2297; G01S 7/414; G01S 15/096; G01S 15/96
USPC .................... 342/179, 159, 176, 91, 181, 41
See application file for complete search history.

(56) References Cited

U.S. PATENT DOCUMENTS

| | | | |
|---|---|---|---|
| 7,916,069 B2* | 3/2011 | Okunishi | G01S 7/34 342/175 |
| 8,094,063 B1* | 1/2012 | Cammerata | G01S 7/2927 342/179 |
| 8,115,674 B2* | 2/2012 | Ohnishi | G01S 13/42 342/202 |
| 9,234,961 B2* | 1/2016 | Dai | G01S 13/582 |
| 9,274,211 B2* | 3/2016 | Maeno | G01S 13/5246 |
| 9,335,402 B2* | 5/2016 | Maeno | G01S 7/2813 |
| 9,568,599 B2* | 2/2017 | Nakahama | G01S 7/02 |
| 9,891,324 B2* | 2/2018 | Nagano | G01S 19/30 |
| 10,317,513 B2* | 6/2019 | Nakahama | G01S 7/10 |

(Continued)

FOREIGN PATENT DOCUMENTS

| JP | 2016-90409 A | 5/2016 |
|---|---|---|
| JP | 6090966 B2 | 3/2017 |

*Primary Examiner* — Erin F Heard
*Assistant Examiner* — Michael W Justice
(74) *Attorney, Agent, or Firm* — Xsensus LLP

(57) ABSTRACT

An echo image generating device may be provided, which includes a signal acquiring module, a sensitivity setting module, and a screen generating module. The signal acquiring module may acquire an echo signal from a target object around a ship. The sensitivity setting module may perform a first sensitivity setting for the echo signal in a first range, and a second sensitivity setting for the echo signal in a second range without including the first range, the second sensitivity setting being different from the first sensitivity setting. The screen generating module may generate an echo image of the first range based on the first sensitivity setting, and generate an echo image of the second range based on the second sensitivity setting.

14 Claims, 14 Drawing Sheets

(56) References Cited

U.S. PATENT DOCUMENTS

| | | | | |
|---|---|---|---|---|
| 2009/0058713 A1* | 3/2009 | Okunishi | ............ | G01S 7/2927 342/91 |
| 2010/0321231 A1* | 12/2010 | Nakahama | ............ | G01S 7/062 342/118 |
| 2015/0054672 A1* | 2/2015 | Nakahama | ............ | G01S 7/2923 342/27 |
| 2017/0067984 A1* | 3/2017 | Nakahama | ............ | G01S 13/937 |

\* cited by examiner

ECHO IMAGE GENERATING DEVICE

CROSS-REFERENCE TO RELATED APPLICATION(S)

This application claims priority under 35 U.S.C. § 119 to Japanese Patent Application No. 2018-117434, which was filed on Jun. 20, 2018, the entire disclosure of which is hereby incorporated by reference.

TECHNICAL FIELD

The present disclosure relates to a device, method, and program for generating an echo image, and particularly to a device and method for generating an echo image for nautical purpose.

BACKGROUND

A radar device mounted on a ship displays an echo image indicating target objects around the ship based on an echo signal of a radio wave emitted from the radar antenna. Typically, the target objects indicated in the echo image are other ships. A sailor visually observes the echo image where other ships are displayed to accurately grasp the situation around the ship, thereby realizing a safe cruise. Therefore, in the signal processing for generating the echo image from the echo signals, echo signals caused by sea surface reflections and rain and snow clutters are normally removed so that mainly the images of the ships can be clearly observed, and a gain adjustment is carried out.

However, the expected target objects to be observed by the radar device are not only ships. For example, there is also a demand of capturing an image of birds. There are various reasons for detecting birds, but if a flock of birds can be captured, the existence of a school of fish can be expected underneath to determine a fishing spot.

Meanwhile, when the gain is adjusted mainly according to the echoes of the ships, the bird echoes of which a signal level is weaker than the ships are often vanished as noise. Therefore, in order for most of users who want to capture the echo of the flock of birds on the echo image not to overlook any small objects, they operate with the gain for the maximum sensitivity. However, when the sensitivity of the entire echo image is raised to detect to the weak echoes in this way, noise then becomes noticeable and the entire echo image becomes difficult to be observed. Especially, the image of a short-distance range from the ship tends to be totally saturated. However, since a flock of birds in the short-distance range is visually observable by using binoculars, there is almost no demand for capturing it on the echo image. Rather, in terms of collision avoidance, the echoes of other ships are desired to be more clearly displayed in the short-distance range than in a long-distance range. Thus, according to the distance from the ship, information on the target objects which users need differs. The same thing can be said for other apparatuses mounted on the ship, such as a sonar and a fish finder.

SUMMARY

Therefore, one purpose of the present disclosure is to provide a device, method, and program for generating an echo image capable of presenting information on a target object which is more needed depending on a distance from a ship.

An echo image generating device may be provided. The echo image generating device may include a signal acquiring module, a sensitivity setting module and a screen generating module. The signal acquiring module may acquire an echo signal from a target object around a ship. The sensitivity setting module may perform a first sensitivity setting for the echo signal in a first range, and a second sensitivity setting for the echo signal in a second range without including the first range, the second sensitivity setting being different from the first sensitivity setting. The screen generating module may generate an echo image of the first range based on the first sensitivity setting, and generate an echo image of the second range based on the second sensitivity setting.

The first range may be a short-distance range located at a short distance from the ship, and the second range may be a long-distance range located at a long distance from the ship. The sensitivity setting module may set the first sensitivity of the echo signal in the short-distance range lower than the second sensitivity of the echo signal in the long-distance range.

The sensitivity setting module may set a first gain for the echo signal in the first range, and a second gain higher than the first gain for the echo signal in the second range.

The screen generating module may generate a first echo image of a lower sensitivity and a second echo image of a higher sensitivity, based on the echo signal. The echo image may be generated by synthesizing a portion corresponding to the first range included in the first echo image, and a portion corresponding to the second range included in the second echo image.

The screen generating module may place an indication of a position of the boundary between the first range and the second range on a screen including the echo image.

The screen generating module may place the indication on the screen both when the boundary is located inside a display range of the echo image, and when the boundary is located outside the display range.

The screen generating module may place a boundary line drawn along the boundary as the indication on the echo image.

The echo image generating device may further include a boundary setting module configured to change a position of the boundary according to an input by a user. When the position of the boundary is changed, the screen generating module may change the indication according to the position after the change of the position.

The echo image generating device may further include a boundary setting module configured to change a position of the boundary according to an input by a user who slides the boundary line. When the position of the boundary is changed, the screen generating module may move a position of the boundary line according to the position after the change of the position on the echo image.

The sensitivity setting module may assign a color palette to the echo signal in the first range and assign a different color palette to the echo signal or an echo trail in the second range.

The sensitivity setting module may assign a video slope to the echo signal in the first range and assign a different video slope to the echo signal or an echo trail in the second range.

The first range may be a circular range centering on a position of the ship, and the second range may be a range adjacent to the first range and surrounding the first range from outside.

A radar device may be provided which includes the echo image generating device described above, and a radar antenna configured to receive the echo signal.

A method of generating an echo image may be provided, which includes (1) acquiring an echo signal from a target object around a ship, (2) performing a first sensitivity setting for the echo signal in a first range and a second sensitivity setting for the echo signal in a second range without including the first range, the second sensitivity setting being different from the first sensitivity setting, (3) generating an echo image of the first range based on the first sensitivity setting, and (4) generating an echo image of the second range based on the second sensitivity setting.

A program of generating an echo image causing a computer to execute following steps may be provided, the steps including (1) acquiring an echo signal from a target object around a ship, (2) performing a first sensitivity setting for the echo signal in a first range and a second sensitivity setting for the echo signal in a second range without including the first range, the second sensitivity setting being different from the first sensitivity setting, (3) generating an echo image of the first range based on the first sensitivity setting, and (4) generating an echo image of the second range based on the second sensitivity setting.

According to the configuration described above, a short-distance sensitivity setting for an echo signal in a short-distance range which is closer to the ship and a long-distance sensitivity setting for an echo signal in a long-distance range which is farther from the ship may be different from each other. Thus, the information on target objects which are more needed depending on the distance from the ship can be provided. For example, in the short-distance range, noise may be reduced to make it easier to observe the movements of other ships, and in the long-distance range where it is difficult to visually observe, a small target object, such as a flock of birds, can be made possible to be observed.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, an echo image generating device according to one embodiment of the present disclosure, a radar device including the device, and a method and a program for generating an echo image, will be described with reference to the drawings.

<1. Configuration of Radar Device>

Figure 1:
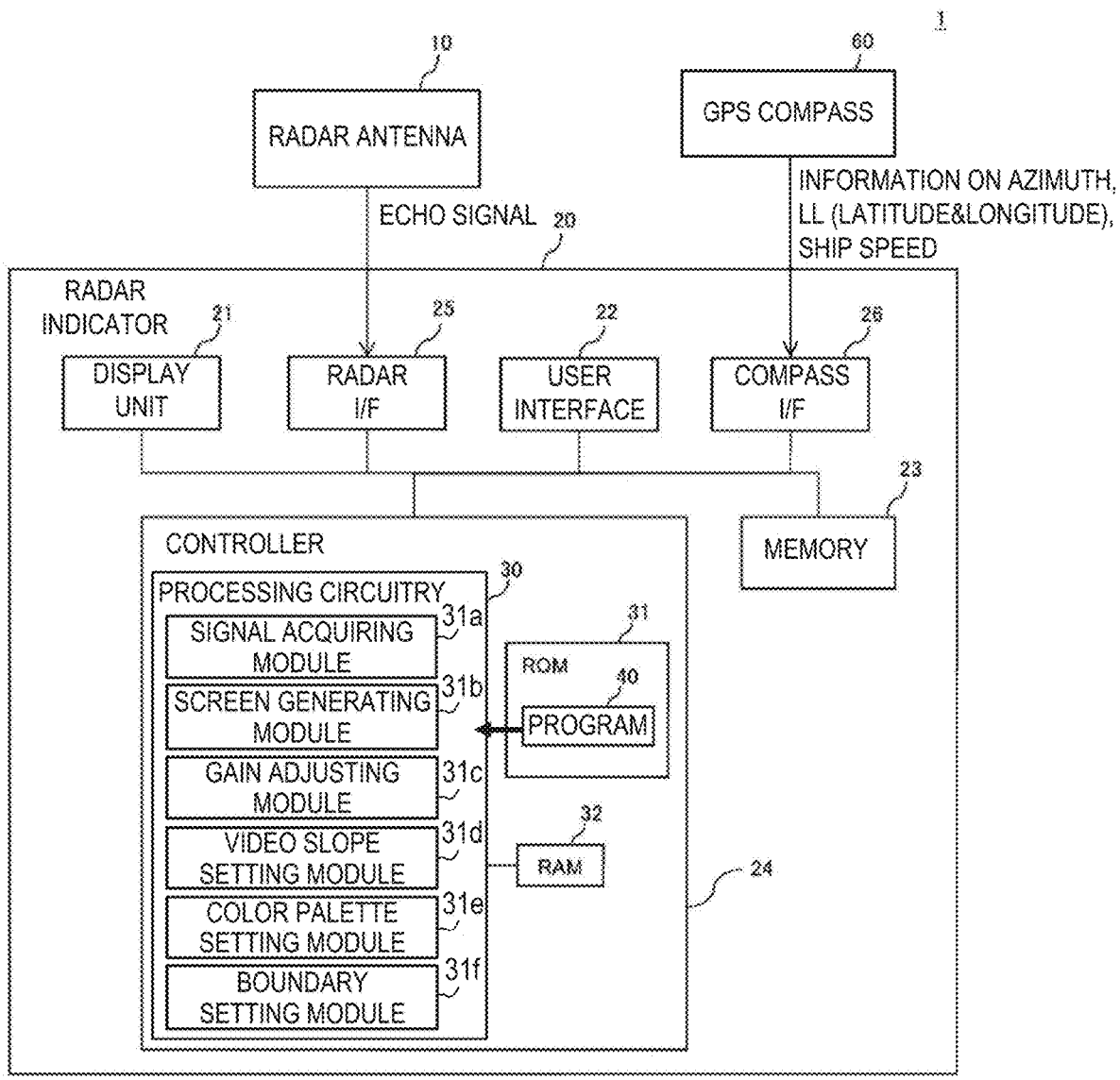
FIG. 1 is a view illustrating the entire configuration of a radar device including an echo image generating device according to one embodiment of the present disclosure.

FIG. 1 illustrates the entire configuration of a radar device 1 including a CPU 30 as an echo image generating device according to this embodiment. The radar device 1 may be a device for assisting a travel of a ship, and may be mounted on the ship (hereinafter, this ship is referred to as "the ship" to be distinguished from other ships). Moreover, as will be described later, since the radar device 1 has a function for facilitating a discovery of the position of a flock of birds (BIRD mode) in order to find out the position of a school of fish, it may be mounted on a ship for fishing. Note that the present disclosure may be applied to ships which typically travels on water or sea (i.e., surface ships), and may also be applied to other types of ships, which may include boats, dinghies, watercraft, and vessels. Further, the present disclosure may also be applied, if applicable, to submarines, aircrafts, and spaceships, as well as any types of vehicles which travel on the ground, such as automobiles, motorcycles, and ATVs.

The radar device 1 may include a radar antenna 10 and a radar indicator 20 connected to the radar antenna 10. The radar antenna 10 may emit a pulse-shaped radio wave and receives an echo signal which is a reflection wave of the emitted radio wave from a target object. The radar antenna 10 may repeat the operation of transmission of the radio wave and reception of the echo signal, while being swiveled in a horizontal plane, thereby scanning 360° around the ship. The echo signal from the target object around the ship received by the radar antenna 10 may be sequentially converted into digital data by an A/D converter (not illustrated), and the converted echo signal may be sequentially outputted to the radar indicator 20.

The radar indicator 20 may be connected to a GPS compass 60 similarly mounted on the ship. The GPS compass 60 can measure information on the bow direction or heading of the ship (hereinafter, may be referred to as "the azimuth information"), information on the latitude and the longitude of the ship (hereinafter, may be referred to as "the LL information"), and the ship speed information which is a speed of the ship, at a given time interval, and these information may be sequentially outputted to the radar indicator 20. Note that the azimuth information, the LL information, and the ship speed information may also be acquirable from various measurement instruments other than the GPS compass 60, such as, a magnetic compass connected to the radar indicator 20, a GPS sensor, and a speed log.

Figure 2:
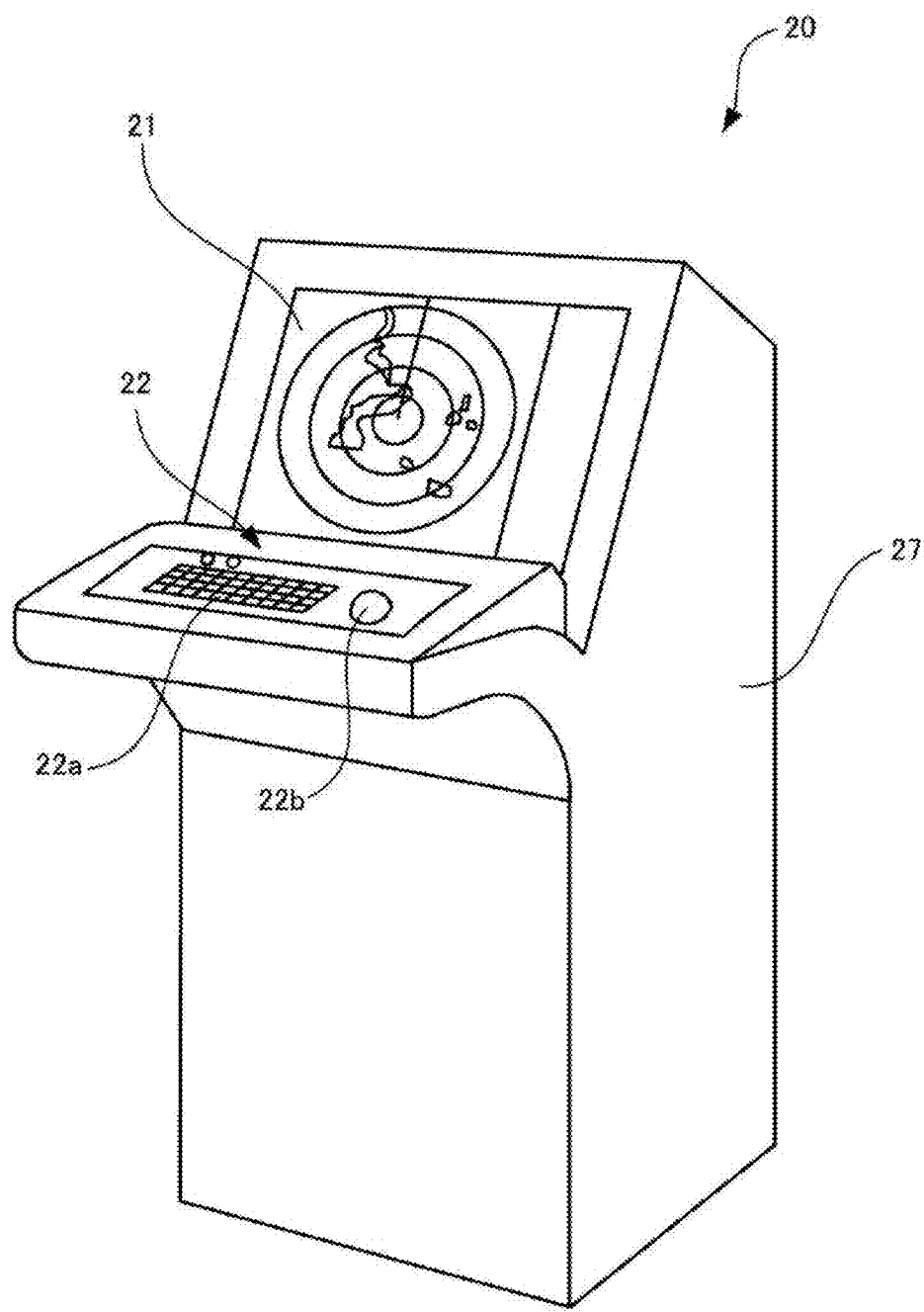
FIG. 2 is an external view of a radar indicator included in the radar device.

FIG. 2 illustrates an external view of the radar indicator 20. The radar indicator 20 may be an apparatus which a user operates, and as illustrated in this figure, it may have a casing 27. The radar indicator 20 may include a display unit 21 and a user interface 22 which are provided at the front side of the casing 27 where the user stands. As illustrated in FIG. 1, the radar indicator 20 may further include a radar interface (I/F) 25, a memory 23, a controller 24, and a compass interface 26. The radar interface 25 may be a communication port with the radar antenna 10, and receive the echo signal outputted from the radar antenna 10. The compass interface 26 may be a communication port with the GPS compass 60, and receive the azimuth information, the LL information, and the ship speed information which are outputted from the GPS compass 60. The memory 23 and the controller 24 may be accommodated inside the casing 27. These parts 21-26 may be connected with each other through a bus line so that they can communicate mutually.

The display unit 21 may be a user interface which displays a screen for presenting a variety of information to the user, and may be comprised of a liquid crystal display in this embodiment. The user interface 22 may receive various input operations by the user for the radar indicator 20, and include a keyboard 22a, a trackball 22b, and a touch panel piled up on the display unit 21 in this embodiment.

The memory 23 may be a nonvolatile storage device comprised of a hard disk drive, a flash memory, etc. The controller 24 may be comprised of a CPU 30 (which is also referred to as processing circuitry 30), a ROM 31, and a RAM 32. The ROM 31 may store a program 40 which causes the CPU 30 to execute various operations. The CPU 30 may read and execute the program 40 stored in the ROM 31 to virtually operate as a signal acquiring module 31a, a screen generating module 31b, a gain adjusting module 31c, a video slope setting module 31d, a color palette setting module 31e, and a boundary setting module 31f The details of operation of these parts 31a-31f will be described later. Note that the program 40 may be stored in the memory 23 instead of the ROM 31, or it may be stored in both of the memory 23 and the ROM 31 distributedly.

<2. Display Processing>

Next, display processing of a radar screen 50 (refer to FIGS. 3 and 4) executed by the radar device 1 is described. The radar screen 50 may be a screen which displays the ship, and the situation of one or more target objects around the ship, and is displayed on the display unit 21. On the radar screen 50, an image (hereinafter, referred to as "the echo image") 51 indicating the echo images of target objects around the ship may be displayed.

The signal acquiring module 31a may sequentially acquire the echo signal through the radar interface 25. The gain adjusting module 31c may perform a gain adjustment to the echo signal sequentially acquired by the signal acquiring module 31a. Note that the gain adjustment may also be achieved by signal processing performed by the gain adjusting module 31c which is implemented as an analog circuit, instead of the digital signal processing by the CPU 30. Moreover, the gain adjustment may be performed inside the radar antenna 10, and in this case, the gain adjustment function of the gain adjusting module 31c is implemented as a controller (including both the digital and analog cases) provided to the radar antenna 10. The same thing can be said to the video slope setting module 31d (described later), and the signal conversion function of the video slope setting module 31d may be implemented as the controller provided to the radar antenna 10.

Meanwhile, although the detail will be described later, there may be NORMAL mode and BIRD mode for the echo image 51, and NORMAL mode is comprised of AUTO mode and MANUAL mode. In AUTO mode, based on the signal level of the received echo signal, a value of the gain may automatically be set so that noise, sea surface reflection, rain and snow clutter, etc. are not displayed. In MANUAL mode, the gain value can be set as an arbitrary value within a preset range from the maximum sensitivity to the minimum sensitivity by a given operation which the user performs through the user interface 22. In MANUAL mode, in order not to overlook any target object (i.e., in order not to overlook even the echo of a target object with a weak signal level, such as a long-distance target object or a small target object), the user may often select the maximum sensitivity. Alternatively, in order to reduce noise appeared in the echo image 51, a lower sensitivity may be selected. In BIRD mode, a suitable value may be selected from some preset values of the gain. In this embodiment, the user can set beforehand of which gain value is selected.

Figure 5:
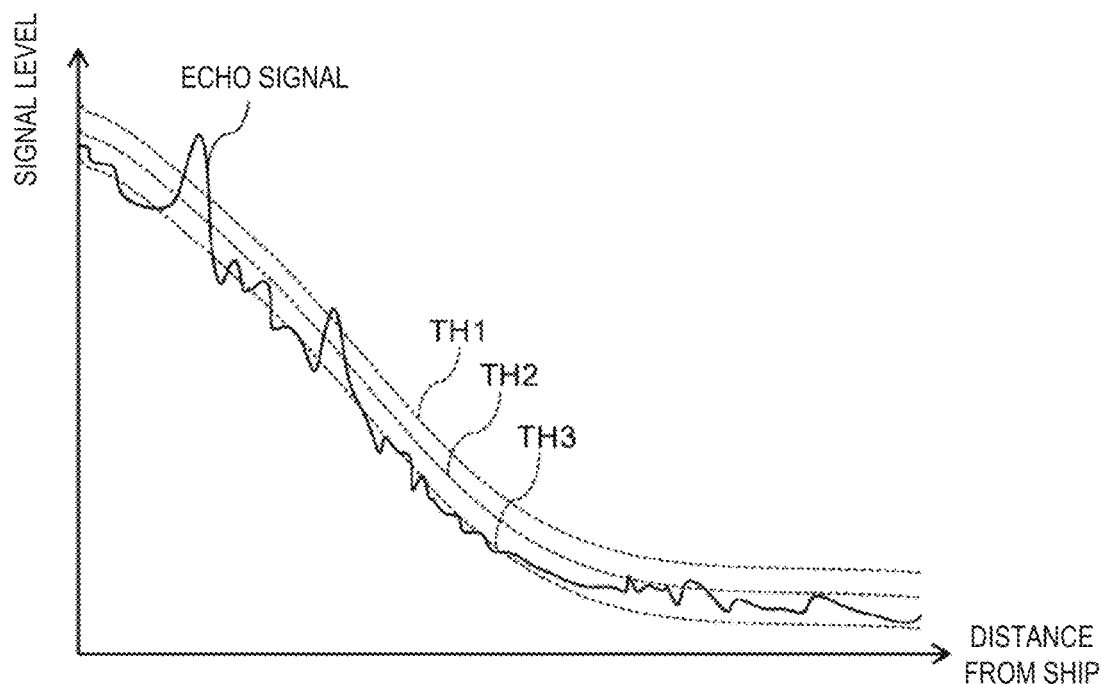
FIG. 5 is a conceptual view illustrating a method of adjusting a gain, where various threshold lines TH1-TH3 for an echo signal are illustrated.

FIG. 5 is a conceptual view illustrating a method of adjusting the gain. The gain adjustment may be performed by setting a threshold line for detecting the echo signal. The threshold line may be drawn as a curve or a straight line in a graph where a distance from the ship is the horizontal axis and the signal level of the echo signal is the vertical axis. In FIG. 5, the threshold lines TH1-TH3 of three levels are illustrated. The threshold value line TH1 may correspond to a state where the signal level is higher than the threshold line TH2, and the sensitivity of the echo signal is lower. Similarly, the threshold line TH2 may correspond to a state where the signal level is higher than the threshold line TH3, and the sensitivity of the echo signal is lower. Therefore, the phrase "raising the gain" as used herein refers to lowering the threshold line from TH1 to TH2, and from TH2 to TH3, and the phrase "lowering the gain" as used herein refers to raising the threshold line from TH3 to TH2, from TH2 to TH1. As the gain value is set, a vertical position of the threshold line may then be determined. That is, the threshold line may move up and down according to the gain value.

Moreover, the shape of the threshold line may be determined according to levels of a sea surface reflection removal and a rain and snow clutter removal. The levels of sea surface reflection removal and rain and snow clutter removal can be set as arbitrary values within preset ranges from the maximum level to the minimum level by given operations which the user performs through the user interface 22. Moreover, the levels of the sea surface reflection removal and the rain and snow clutter removal can also be set automatically, and by the user performing a given operation through the user interface 22, he/she can select either the automatic setting or the manual setting of the levels.

In addition to the gain value set automatically or manually, the gain adjusting module 31c may also determine the threshold line according to the levels of the sea surface reflection removal and the rain and snow clutter removal which are set automatically or manually. Note that the sea surface reflection may have such a characteristic that the signal level is stronger as it is closer to the radar antenna 10, and the signal level falls rapidly as it is separated from the radar antenna 10 beyond a certain distance. Therefore, for example, the gain adjusting module 31c divides a certain distance range from the ship into subranges according to the distance from the ship, and calculates an average value of the echo signal for every subrange. Then, by adjusting these average values according to the level of the sea surface reflection removal set automatically or manually, an adjusting amount of the threshold line for the sea surface reflection removal may be determined for every subrange. Moreover, the rain and snow clutter may be influenced not only by the distance from the radar antenna 10 but the weather etc. Therefore, the gain adjusting module 31c may perform similar processing to the sea surface reflection removal for a more distant range, in addition to the nearby range to the radar antenna 10 to determine an adjusting amount of the threshold line for the rain and snow clutter removal for every subrange according to the distance from the ship. Then, the shape of the threshold line may be determined by the adjusting amounts of the threshold line determined as described above.

Figure 6:
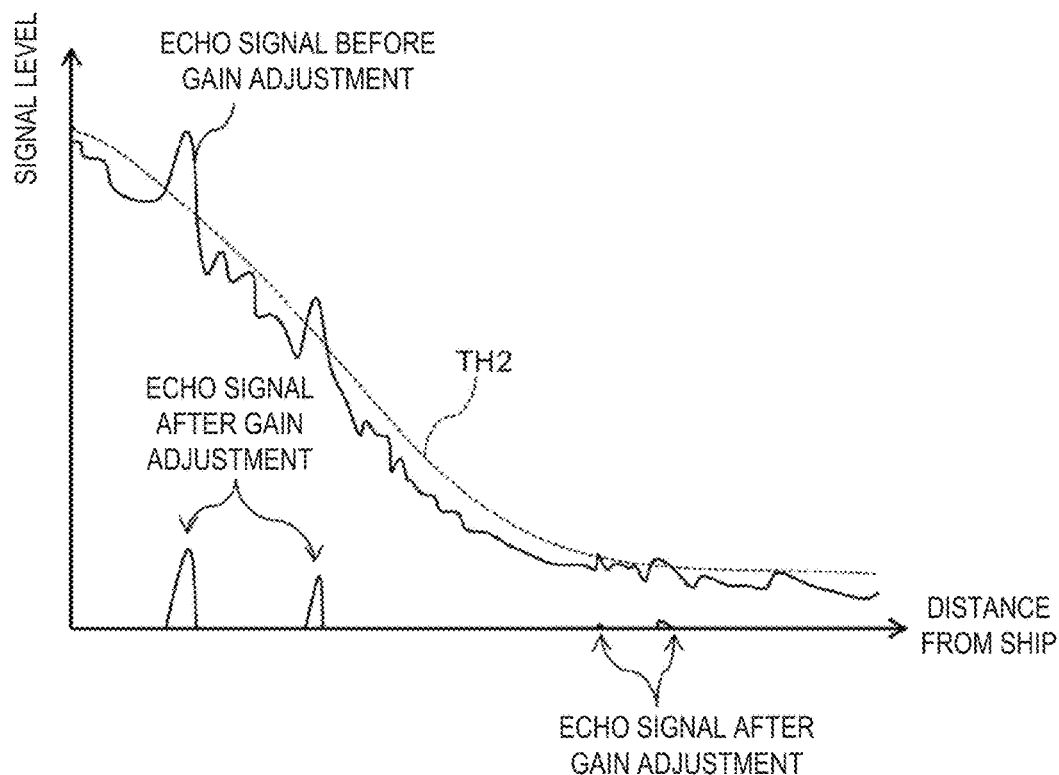
FIG. 6 is a view illustrating an echo signal after a gain of the echo signal of FIG. 5 is adjusted by the threshold line TH2.

After the determination of the threshold line, the gain adjusting module 31c may generate the echo signal after the gain adjustment by subtracting a threshold indicated by the threshold line from the echo signal before the gain adjustment. FIG. 6 illustrates the echo signal after carrying out the gain adjustment of the echo signal of FIG. 5 by the threshold line TH2 of FIG. 5.

Figure 7:
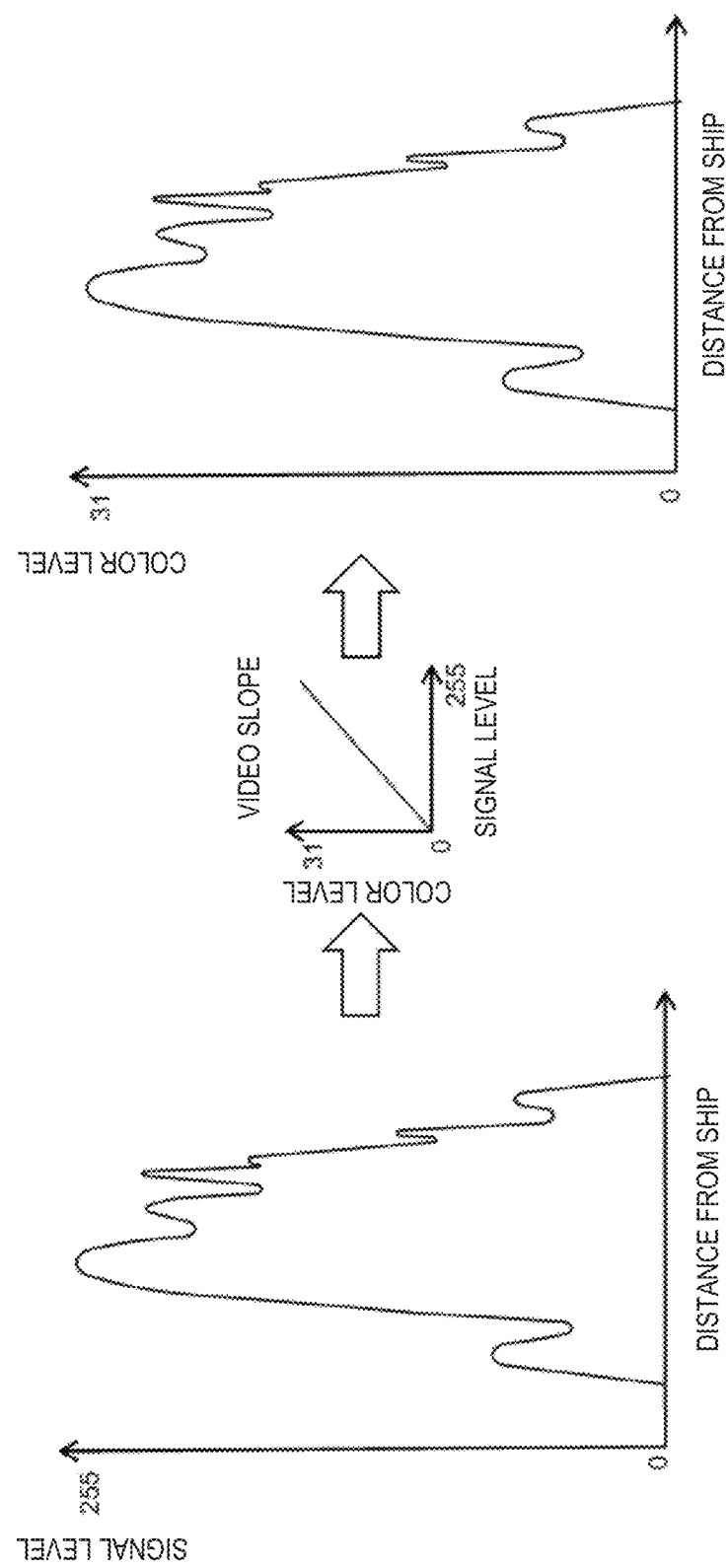
FIG. 7 is a view illustrating a video slope for converting a signal level of the echo signal into a color level.
Figure 8:
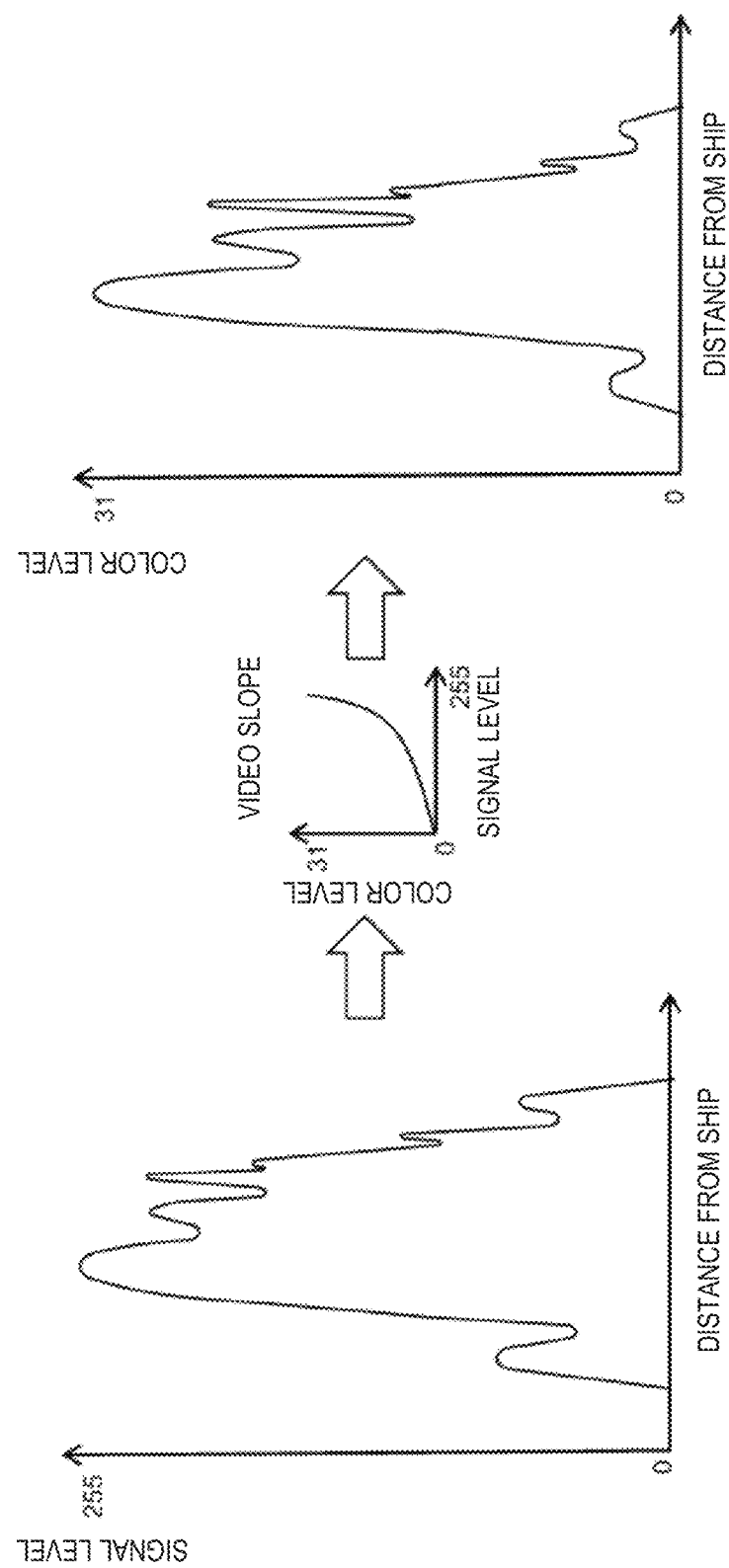
FIG. 8 is a view illustrating another video slope for converting the signal level of the echo signal into the color level.
Figure 9:
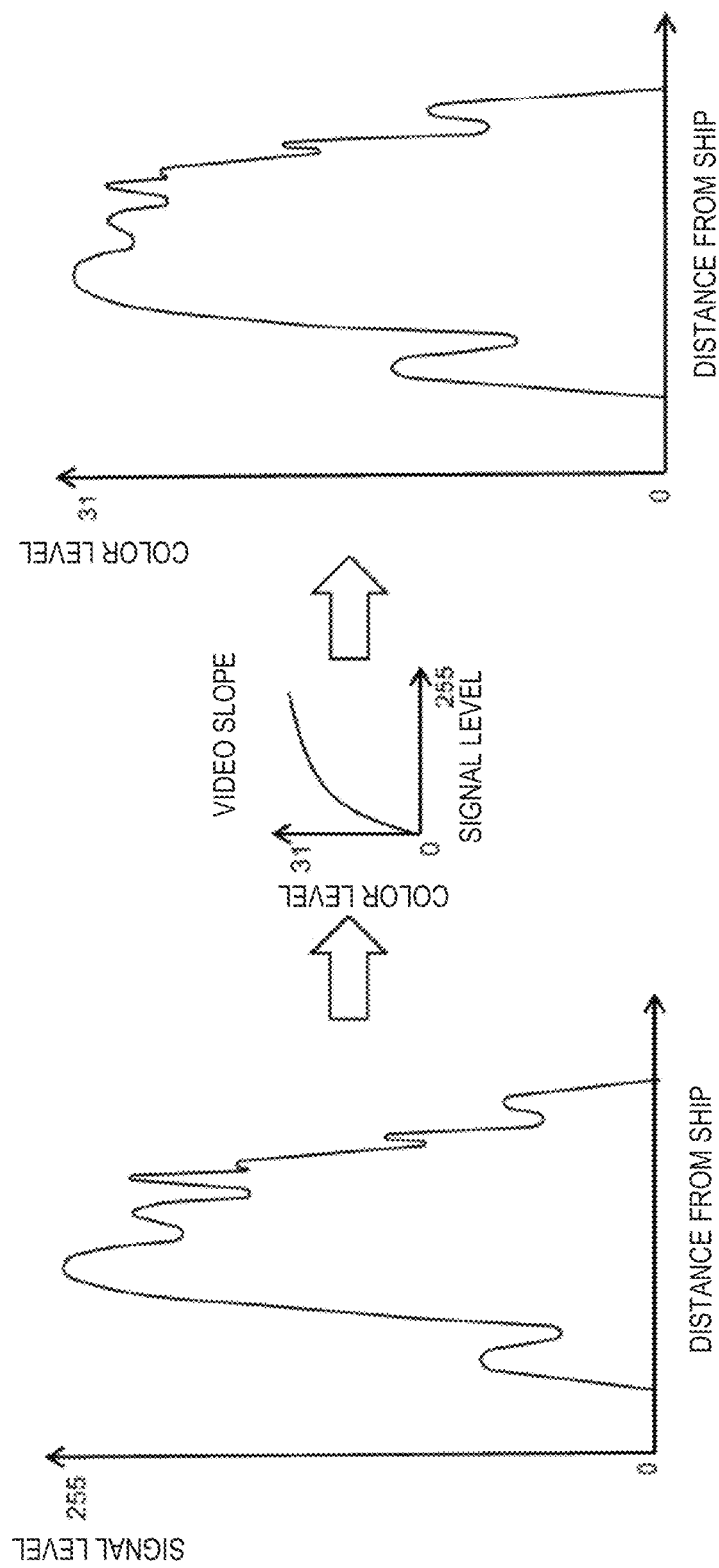
FIG. 9 is a view illustrating another video slope for converting the signal level of the echo signal into the color level.

A color level of each pixel of the echo image 51 may be determined according to the signal level of the echo signal corresponding to the pixel concerned. Therefore, the video slope setting module 31d may set a video slope to be applied to the echo image 51, and the screen generating module 31b may convert the signal level of the echo signal after the gain adjustment into the color level based on this video slope. The video slope may be a conversion factor for converting the signal level into the color level. For example, supposed that the signal level is divided into 256 levels from 0 to 255, and the color level has 32 levels from 0 to 31. Here, as illustrated in FIG. 7, if assigning the color level equally to the signal level, the video slope may be determined so that a relation of the signal level vs. the color level has a linear relation. On the other hand, if a color change to the signal level is to be exaggerated (i.e., the color change is large at the place where the signal level is strong, and the color change is small at the place where the signal level is weak), as illustrated in FIG. 8, the video slope may be determined so that a rate of change in the color level increases as the signal level becomes higher. On the contrary, if the color change to the signal level is to be smoothened (i.e., the color change is large at the place where the signal level is weak, and the color change is small at the place where the signal level is strong) as illustrated in FIG. 9, the video slope may be determined so that the rate of change in the color level increases as the signal level becomes lower. The user can select the automatic or manual setting of the video slope by performing the given operation through the user interface 22. If setting manually, the user can select, for example, from a plurality of predefined patterns of the video slope.

The color level converted from the signal level based on the video slope may further be converted into the color to be displayed on the display unit 21 (hereinafter, referred to as "the display color"). Therefore, the color palette setting module 31e may set a color palette to be applied to the echo image 51, and the screen generating module 31b may then convert the color level into information on the display color based on the color palette. For example, the lowest color level "0" is converted into "black" used as a background color of the echo image 51, the next color level "1" is converted into green, and the highest color level "31" is converted into "red." The color palette may be a conversion table which defines such a correlation between the color level and the display color. The user can select an automatic or manual setting of the color palette by performing a given operation through the user interface 22. If setting manually, the user selects, for example, from a plurality of predefined patterns of the color palette. Moreover, the user may define the color palette by set colors from the gradation of 0 to 31 to use this color palette.

As described above, the video slope may be a parameter which can adjust the exaggeration of the color change, and the color palette is a parameter which can adjust the display color. Meanwhile, the user may recognize the position of a target object by visually observing the echo image 51 displayed on the display unit 21. Therefore, it can be said that the sensitivity of the echo signal when generating the echo image 51 is determined not only by the gain value but also by the video slope and the color palette. In this sense, the setting of the video slope and the color palette, and the conversion of the signal based on the setting may be also a kind of the sensitivity adjustment of the echo signal.

Figure 3:
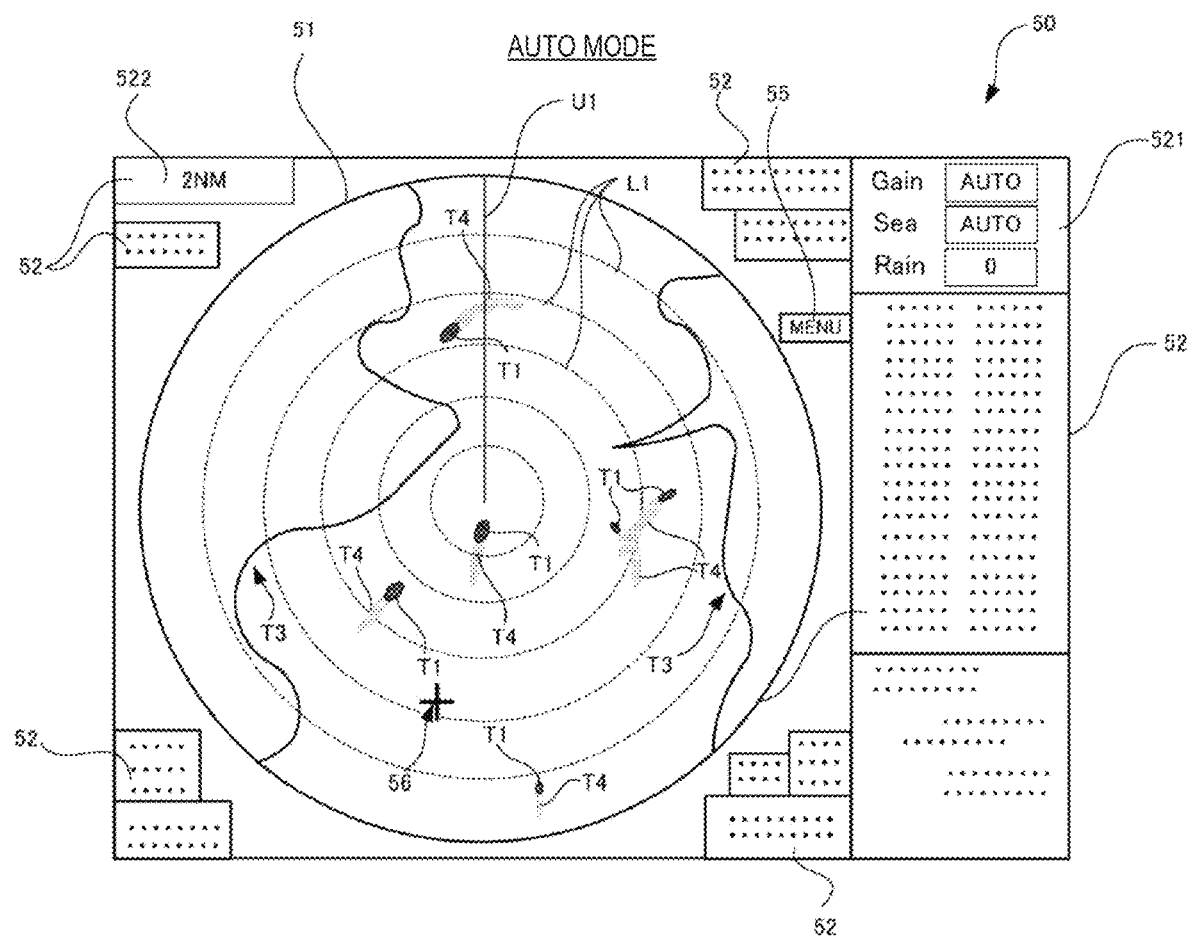
FIG. 3 is a view illustrating one example of a radar screen in AUTO mode.
Figure 4:
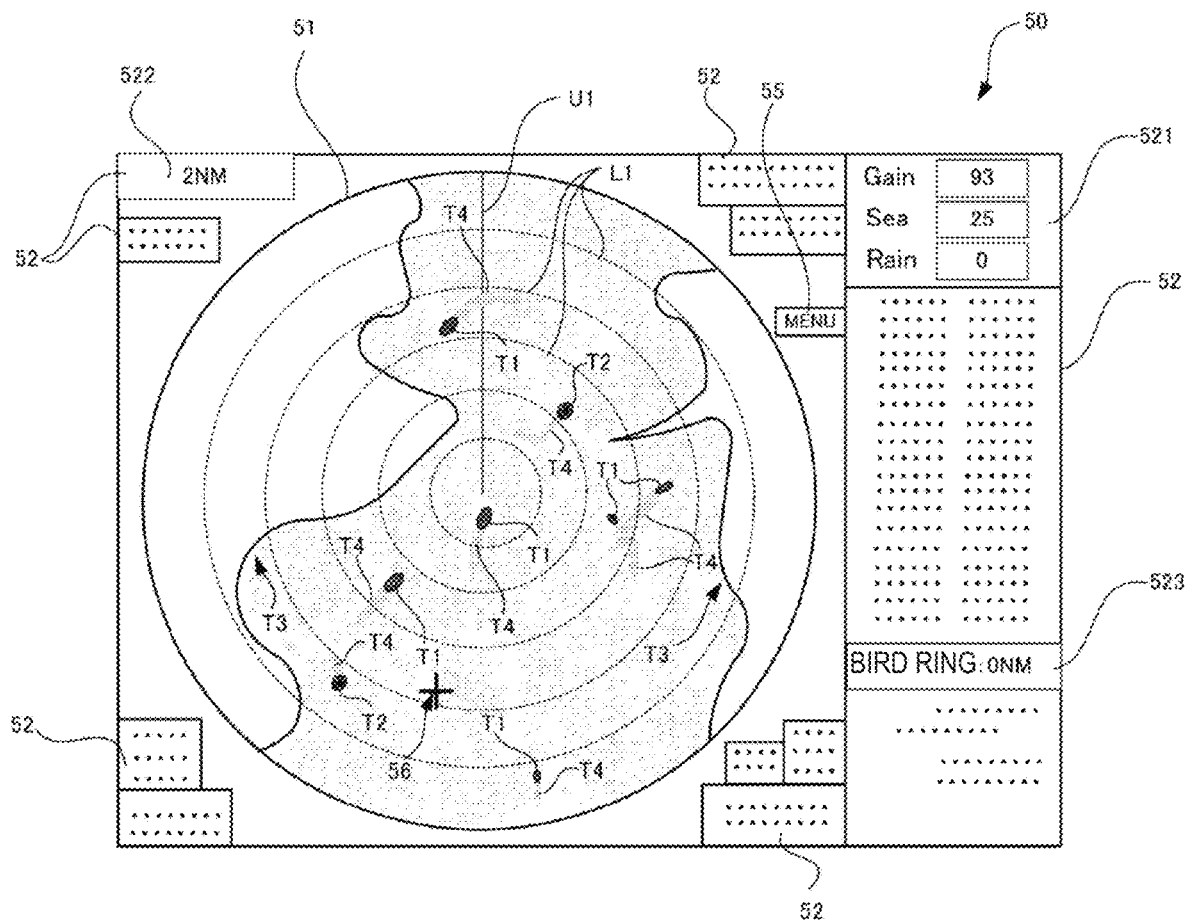
FIG. 4 is a view illustrating one example of a radar screen in BIRD mode.

The screen generating module 31b may generate the echo image 51 after the gain adjustment based on the echo signal further converted into the information on the display color. The echo image 51 may turn out to be a map in which the positions of the target objects which exist within the range around the ship are illustrated in a map fashion. As illustrated in FIGS. 3 and 4, the radar screen 50 may be entirely of a rectangular shape, and the circular echo image 51 is disposed on the radar screen 50. Note that one echo image 51 may be generated from the echo signals for one revolution of the radar antenna 10 (scanning data).

The radio wave from the radar antenna 10 may be reflected not only by other ships and flocks of birds but also by various other target objects, such as land and buoys. Therefore, on the echo image 51, land images T3 and buoy images may be displayed, other than the images T1 of other ships and the images T2 of flocks of birds. Note that, generally, since birds go up and down between the water surface and the sky, this movement may cause unevenness in the intensity of the echo signal of a flock of birds, which also causes unevenness of the echo image. Therefore, the image of the flock of birds may be distinguishable just by visually observing the echo image. The echo image 51 may be updated based on a new echo signal each time the echo signal is acquired. Therefore, the user can grasp the situation around the ship on real time, while visually observing the echo image 51.

Moreover, the screen generating module 31b can display an image T4 of an echo trail of a target object on the echo image 51. Specifically, the echo trail image T4 of the target object may be formed by superimposing the echo images of the target object displayed in past echo images 51 on the latest echo image 51. The user can switch the setting of "display" or "not display" of the echo trail image T4 by performing a given operation through the user interface 22. The user can grasp the movement of the target object more accurately by the echo trail image T4.

Moreover, the screen generating module 31b may display a heading bright line U1 on the echo image 51 based on the azimuth information and the LL information. The heading bright line U1 may be displayed on the echo image 51 as a line extending in the bow direction or heading of the ship from the current position of the ship to the perimeter of the echo image 51. That is, an inner end of the heading bright line U1 may represent the current position of the ship.

Moreover, the screen generating module 31b may display an information display range 52 on the radar screen 50, in addition to the echo image 51. In the example of FIGS. 3 and 4, the information display range 52 may be arranged along the right end of the radar screen 50, and the information display ranges 52 may also be arranged at other corners of the radar screen 50, so that they are not overlapped with the echo image 51. Variety of information for assisting the cruise of the ship, for example, ship information and environment information around the ship may be displayed in the information display ranges 52. The ship information includes, for example, the LL information, the azimuth information, and the ship speed information on the ship. The environment information includes, for example, information on water temperature, a water depth, a wind direction, and a wind velocity. Note that some of the information displayed on the information display range 52 may be calculated based on the information acquired from the various measuring instruments connected to the radar indicators 20, which includes the GPS compass 60.

Moreover, the values of the setting of the gain, the sea surface reflection removal level, and the rain and snow clutter removal level which are described above may be displayed on the information display range 52, and the information display range 52 may include an area 521 which accepts changes of these settings from the user. The user can input the setting values of the gain, the sea surface reflection removal level, and the rain and snow clutter removal level by operating the user interface 22 to perform given operations in the area 521.

Figure 10:
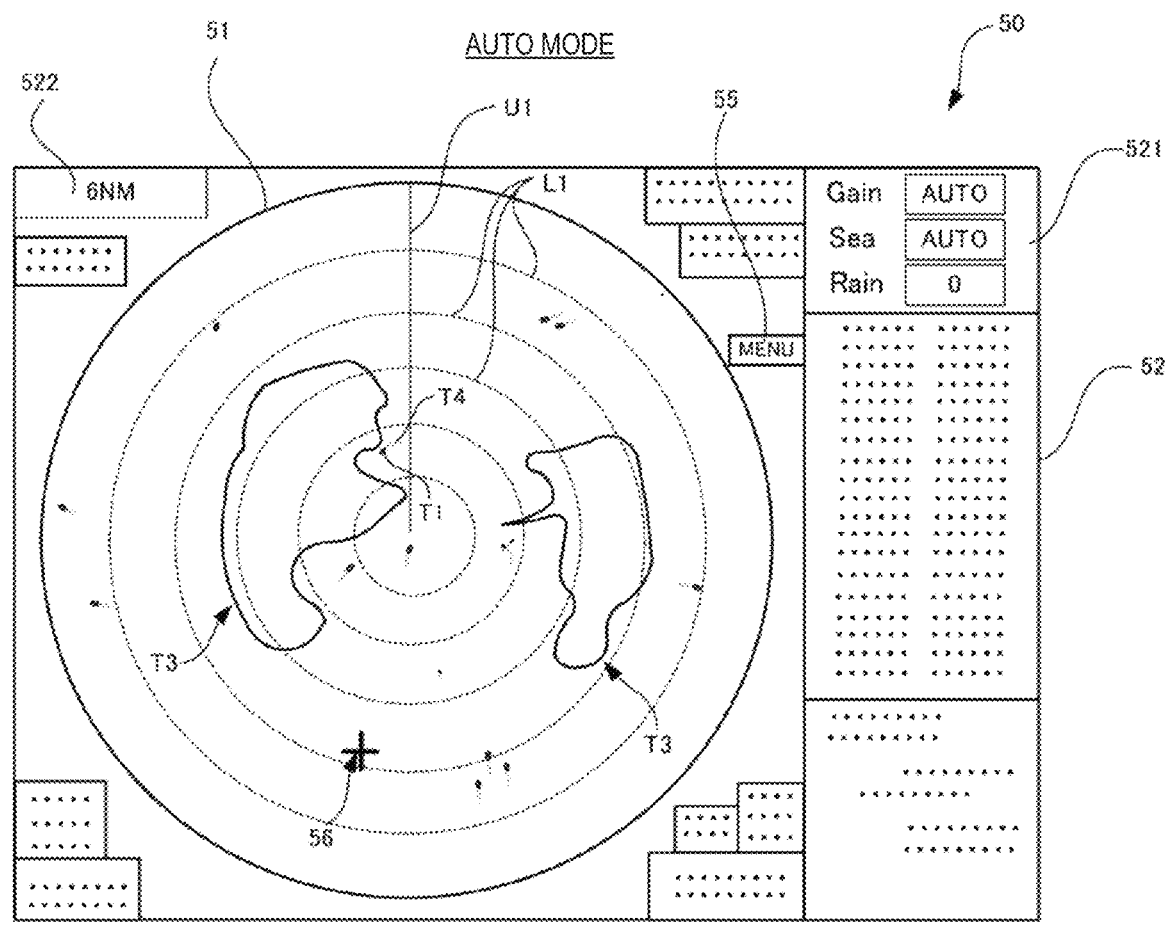
FIG. 10 is a view illustrating one example of the radar screen where a display range of the echo image of FIG. 3 is enlarged.

The user can suitably set the display range of the echo image 51. That is, the user can freely change the zoom ratio of the echo image 51. FIG. 3 illustrates the echo image 51 when the display range is set as 2 NM (nautical mile), and FIG. 10 illustrates the echo image 51 when the display range is set as 6 NM by enlarging the 2 NM display range of the echo image 51 by 3 times. The information display range 52 may display the settings of the display range, and include an area 522 which accepts changes of the settings from the user. The user can input the setting values of the display range by operating the user interface 22 to perform a given operation in the area 522. Note that, as illustrated in FIGS. 3 and 4, on the echo image 51, a plurality of circles L1 having different diameters which are coaxially arranged at a certain diameter difference, centering on the position of the ship may be displayed as a scale which measures the distance from the position of the ship.

A main menu button 55 may be displayed on the radar screen 50. The main menu button 55 may be desirably arranged so as not to overlap with the echo image 51. Moreover, a cursor 56 may be also displayed on the radar screen 50. The cursor 56 may be freely movable on the radar screen 50 by the user operating the user interface 22. In this embodiment, when the user performs a given operation in the user interface 22 while the cursor 56 is located on the main menu button 55, the main menu button 55 may then open hierarchically to show various sub menu buttons. The sub menu button may be desirably arranged so as not to overlap with the echo image 51. The user can perform a desirable function implemented in the radar indicator 20 by operating the user interface 22 to select a suitable button from these sub menu buttons.

Meanwhile, there may be various modes including BIRD mode in the echo image 51, and the user can switch the mode arbitrarily by performing a given operation through the user interface 22. The echo image 51 in AUTO mode which is a mode in which the gain value is set automatically may be an echo image generated for the purpose of legibly displaying mainly the images T1 of other ships. On the other hand, the echo image 51 in BIRD mode may be an echo image generated so as to display the images T2 of flocks of birds which return weak echo signals as compared with ships. AUTO mode is typically used for observing the movements of other ships during the cruise of the ship to avoid collisions with other ships, or grasping the positions of consort ship. On the other hand, BIRD mode is typically used for the purpose of discovering a flock of birds, i.e., discovering a school of fish which is expected to be existed underneath the flock of birds.

Figure 11A:
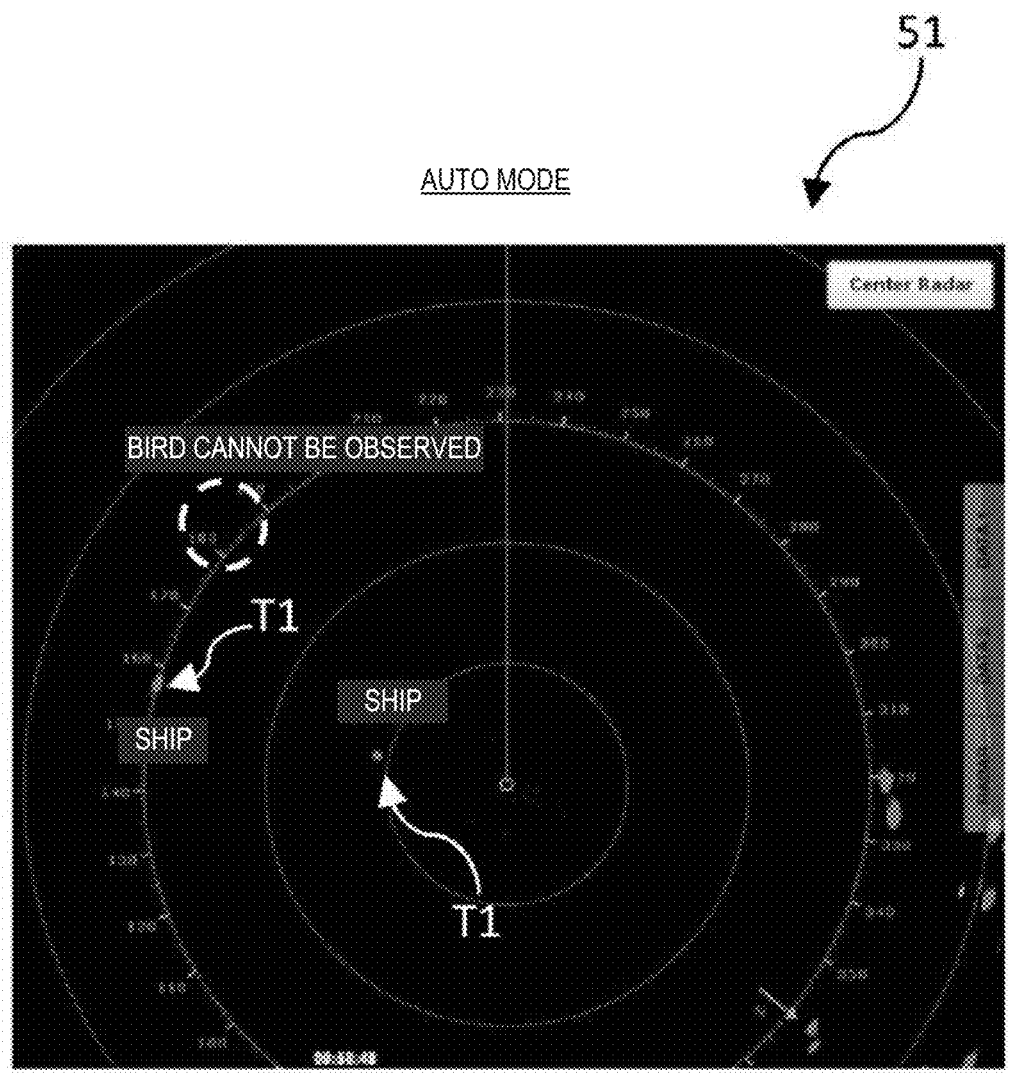
FIG. 11A is a view illustrating one example of the echo image in AUTO mode.
Figure 11B:
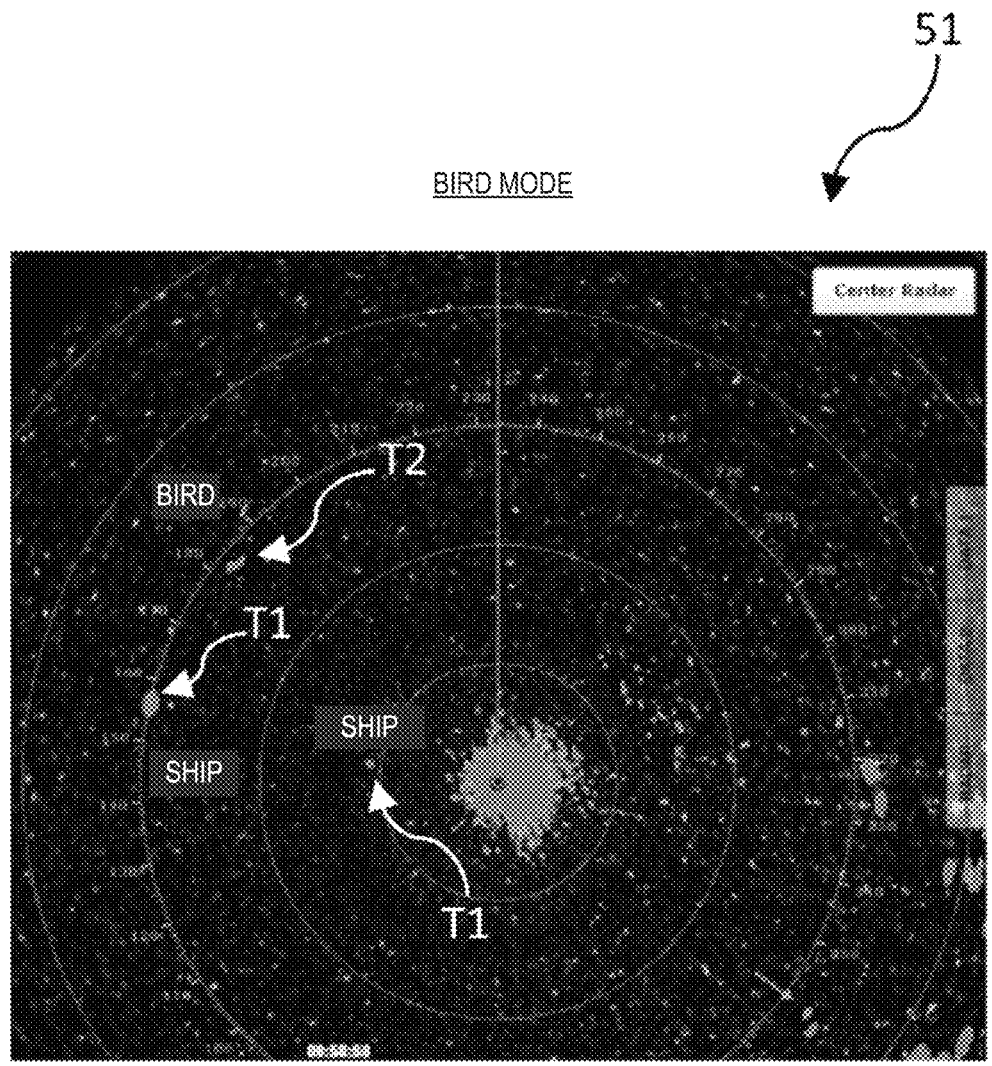
FIG. 11B is a view illustrating one example of the echo image in BIRD mode.

FIG. 3 illustrates one example of the radar screen 50 in AUTO mode, and FIG. 4 illustrates one example of the radar screen 50 in BIRD mode. Moreover, FIG. 11A illustrates one example of the echo image 51 in AUTO mode, and FIG. 11B illustrates one example of the echo image 51 in BIRD mode based on the same echo signals as the echo image 51 of FIG. 11A. As can be seen from these figures, in BIRD mode, noise may be entirely noticeable as compared with AUTO mode. However, in BIRD mode, the image T2 of a flock of birds can be observed, which is hardly appeared in AUTO mode. On the other hand, in AUTO mode, since the noise is entirely less, the images T1 of other ships may appear more clearly than BIRD mode.

The sensitivity of the echo signal may be adjusted according to the currently-set mode. In NORMAL mode, the sensitivity may be adjusted automatically or manually according to the gain, the video slope, and the color palette. On the other hand, in BIRD mode, the sensitivity may be automatically (semiautomatic ally) adjusted so that the echo signal of a flock of birds weaker than the echo signal of a ship can be observed. More specifically, in BIRD mode of this embodiment, a value may be selected by the user from some gain values which enable the observation of the weak echo signal. The video slope and the color palette may be similarly treated. However, in another embodiment, the gain, the video slope, and the color palette in BIRD mode may be adjusted in a fully-automatic manner without the selection by the user. In either way, in BIRD mode, in order to observe the image T2 of a flock of birds, the gain value may become larger than that by the automatic setting in NORMAL mode (in AUTO mode), and the threshold line may be lowered. Moreover, in BIRD mode, the sensitivity may be raised more than that by the automatic setting in NORMAL mode so that the image of a flock of birds will not disappear by the excessive noise removal, and the levels of the sea surface reflection removal and the rain and snow clutter removal may be lowered. Moreover, in BIRD mode, it may be desirable not to perform the rain and snow clutter removal.

In BIRD mode, the sensitivities may be set higher than those by the automatic setting in NORMAL mode for the video slope and the color palette, in addition to the gain. For example, the video slope when it is automatically set in NORMAL mode is a video slope as illustrated in FIG. 7, the video slope in BIRD mode may be a video slope as illustrated in FIG. 9. Moreover, for example, when the former video slope is a video slope as illustrated in FIG. 8, the latter video slope may be a video slope as illustrated in FIG. 7 or FIG. 9. As for the video slope, the width of the color level may become narrower as the signal level increases in order of FIG. 9, FIG. 7, and FIG. 8, and the tendency for the width of the color level becomes stronger as the signal level may be lowered. That is, in this order, even if the echo signal is weak, it can be expressed by more number of colors. Therefore, the sensitivity of the echo signal may increase in this order.

Moreover, as for the color palette, it may be assigned with more stand-out or noticeable colors by lower color levels in BIRD mode, rather than those by the automatic setting in NORMAL mode. For example, "green" is assigned to the color level during the automatic setting in NORMAL mode, and more noticeable "yellowish green" is assigned in BIRD mode. Moreover, "yellow" may be assigned to the color level in the former, and more noticeable "orange" may be assigned in the latter. Therefore, in BIRD mode, even if the echo signal is weak, it can be expressed by more noticeable colors, and the sensitivity of the echo signal is raised.

Here, the adjustment of the sensitivity in BIRD mode may be performed only when creating the echo image 51 in a long-distance range A2, and it may not be performed when creating the echo image 51 in a short-distance range A1. That is, the short-distance range A1 and the long-distance range A2 may be set according to the input by the user, and when these ranges A1 and A2 are set, the echo image 51 of the short-distance range A1 becomes similar to that by the automatic setting in NORMAL mode. On the other hand, when these ranges A1 and A2 are not set, the echo image 51 in BIRD mode as described above may be generated.

Figure 12:
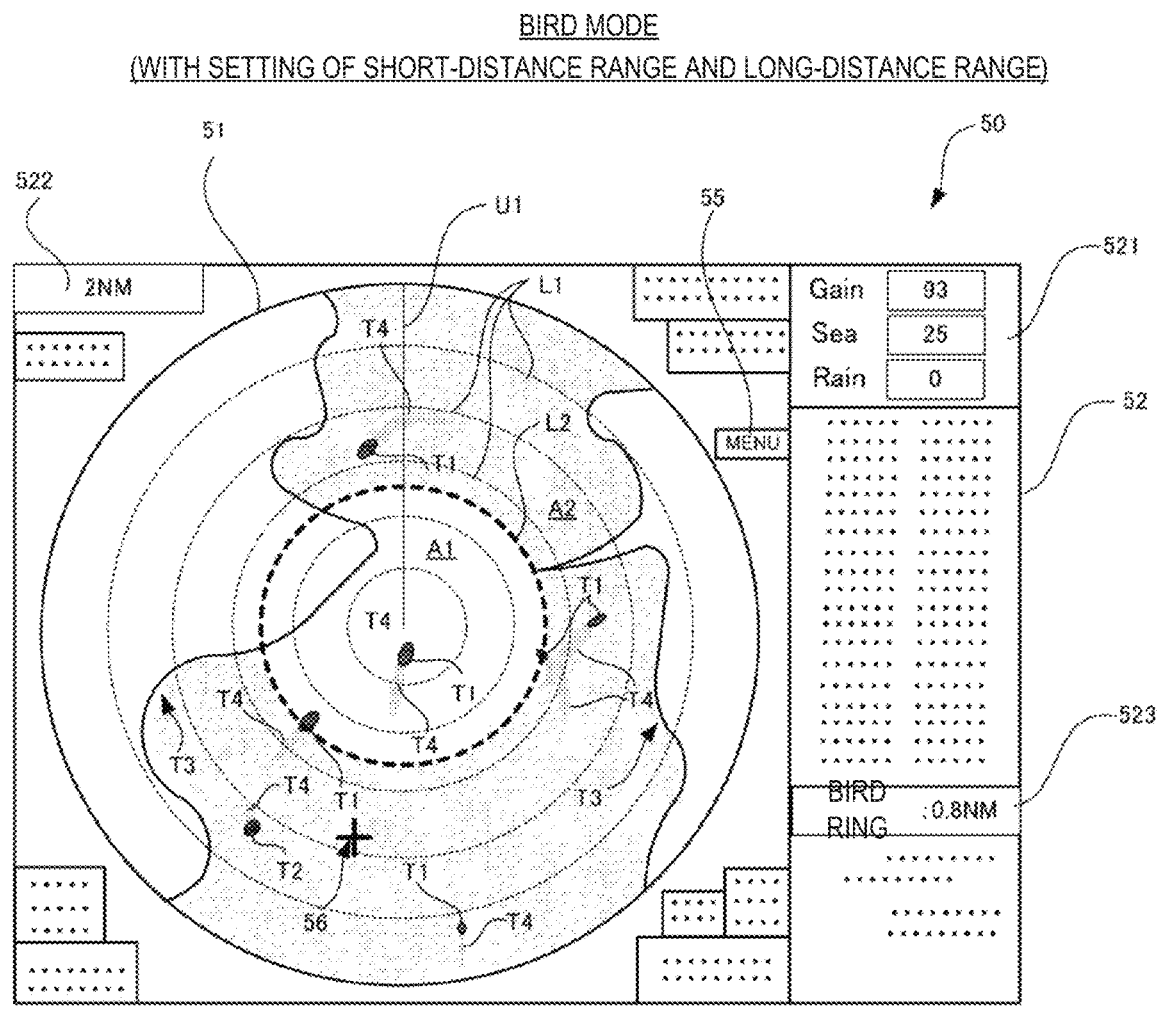
FIG. 12 is a view illustrating one example of the radar screen in BIRD mode in which a short-distance range and a long-distance range are set.

FIG. 12 illustrates one example of the radar screen 50 when the short-distance range A1 and the long-distance range A2 are set. The short-distance range A1 may be a circular range centering on the position of the ship, and its radius may be set by the user. The long-distance range A2 may be an annular range which is adjacent to the short-distance range A1 and surrounds the short-distance range A1 from outside. The echo image 51 may be comprised only of the short-distance range A1 and the long-distance range A2, and these ranges A1 and A2 are determined when the position of a boundary therebetween is defined. The boundary setting module 31f may accept a value of the boundary position from the user, and then set the boundary position according to the input by the user.

The screen generating module 31b may place a boundary line (hereinafter, referred to as "the bird ring") L2 which is drawn along the boundary on the echo image 51 as an indication of the position of the boundary between the short-distance range A1 and the long-distance range A2. Therefore, the user can immediately understand where the boundary across which the setting of the sensitivity changes exists on the echo image 51. Moreover, in this embodiment, the information display range 52 may also include an area 523 which indicates the radius (i.e., the radius of the bird ring L2) of the short-distance range A1 as another indication of the position of the boundary between the short-distance range A1 and the long-distance range A2. Also by this, the user can immediately understand the position of the boundary where the sensitivity changes on the echo image 51.

The user can freely change the position of the boundary between the short-distance range A1 and the long-distance range A2 by performing a given operation through the user interface 22. For example, the boundary setting module 31f can change the boundary position according to the input by the user who slides the bird ring L2. When the boundary position is changed, the screen generating module 31b may move the position of the bird ring L2 on the echo image 51 according to the position after the change, and also change the value indicative of the radius of the bird ring L2 in the area 523 (i.e., a value of the distance from the ship, which indicates the position of the bird ring L2). The slide operation of the bird ring L2 may be performed, for example, by touching with a finger an arbitrary portion of the bird ring L2 displayed on the display unit 21 where the touch panel is laminated, and sliding the portion radially outward. In this case, the bird ring L2 may move outwardly on the echo image 51 so that the short-distance range A1 is expanded and the long-distance range A2 is contracted. On the other hand, when the user touches the bird ring L2 with the finger and slides it radially inward, the short-distance range A1 may be contracted and the long-distance range A2 may be expanded. Moreover, in this embodiment, the area 523 may accept an instruction from the user for changing the radius of the short-distance range A1 (i.e., the radius of the bird ring L2). That is, the position of the boundary between the short-distance range A1 and the long-distance range A2 can be changed also by inputting into the area 523 a numerical value indicative of the position after the change. Also when the boundary position is changed through the area 523, the indication of the bird ring L2 may be changed according to the change.

Figure 13:
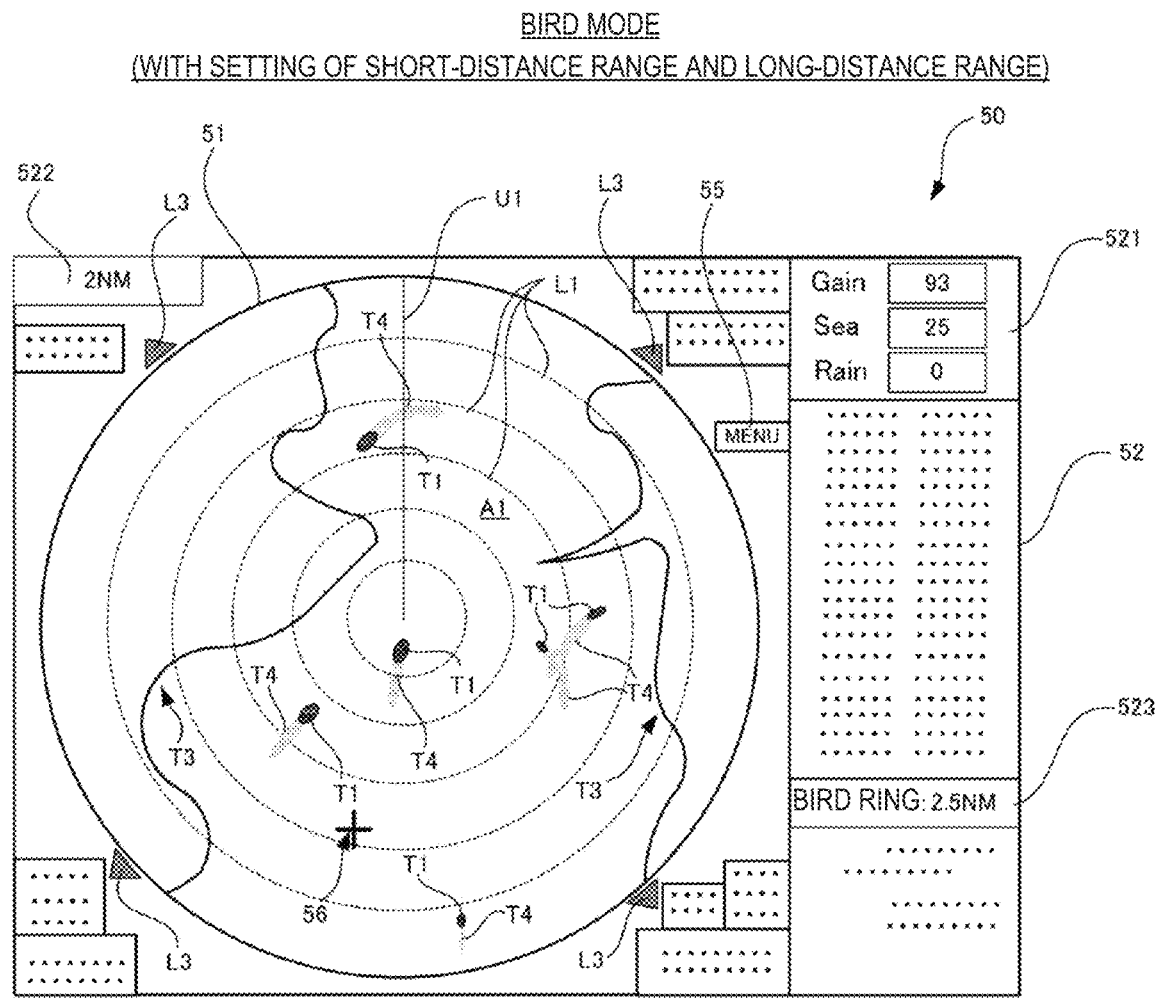
FIG. 13 is a view illustrating one example of the radar screen when the position of a bird ring is changed outside the display range of the echo image in FIG. 12.

Meanwhile, the bird ring L2 cannot be displayed on the echo image 51 depending on the setting of the display range of the echo image 51. That is, if the size of the bird ring L2 is larger than the display range of the echo image 51, and the boundary between the short-distance range A1 and the long-distance range A2 is located outside the display range of the echo image 51, the bird ring L2 cannot be placed on the echo image 51. In such a case, as illustrated in FIG. 13, an indication L3 of the position of the imaginary bird ring L2 may be displayed on the radar screen 50 in order to indicate that the bird ring L2 exists outside the display range of the echo image 51. In the example of FIG. 13, the indications L3 may be placed along the perimeter of the echo image 51, and has triangular arrows pointing out the radial outward direction. Moreover, also in such a case, the position of the bird ring L2 can be confirmed by the indication in the area 523. As described above, the indication of the position of the boundary between the short-distance range A1 and the long-distance range A2 may be placed on the radar screen 50 in both the cases where the boundary is located inside the display range of the echo image 51 and the boundary is located outside the display range.

Figure 14:
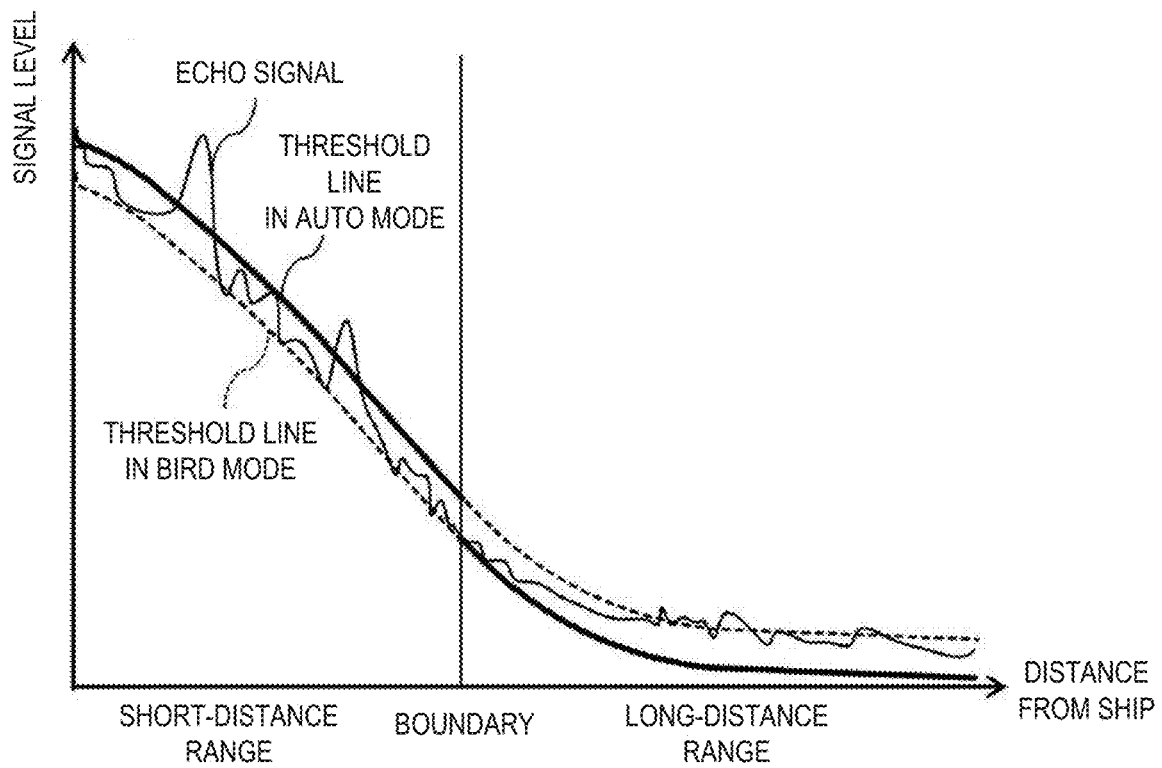
FIG. 14 is a view illustrating the threshold line in BIRD mode.

The sensitivity setting of the echo signal may differ in the short-distance range A1 and the long-distance range A2 set as described above. More specifically, as already described, the sensitivity of the echo signal in the long-distance range A2 may be in agreement with the sensitivity in BIRD mode, and the sensitivity of the echo signal in the short-distance range A1 may be agreement with the sensitivity by the automatic setting in NORMAL mode. Therefore, the sensitivity of the echo signal in the short-distance range A1 may be adjusted to become lower than the sensitivity of the echo signal in the long-distance range A2. That is, a value higher than the gain value for the echo signal in the short-distance range A1 may be set as the gain value for the echo signal in the long-distance range A2. Note that, as illustrated in FIG. 14, the threshold line may cause a step at the position of the boundary between the ranges A1 and A2 at this time, and it may become discontinuous bordering the boundary position. Moreover, a different color palette and a different video slope may be assigned to the echo signal in the short-distance range A1 and the echo signal in the long-distance range A2. The screen generating module 31b may generate the echo image 51 with the different sensitivities for the short-distance range A1 and the long-distance range A2 based on the echo signal for which the sensitivity is adjusted in this way, and display it on the display unit 21. Here, in order to lower the calculation load, the echo image 51 of the short-distance range A1 and the echo image 51 of the long-distance range A2 may be generated in ranges which do not overlap with each other.

As described above, in this embodiment, the information on the target objects which are more needed depending on the distance from the ship can be provided. That is, in the short-distance range A1, noise may be reduced to make it easier to observe the movements of other ships, and in the long-distance range A2 where a small target object, such as a flock of birds, is difficult to be visually observed, such a small target object can be made possible to be observed on the echo image 51.

<3. Modifications>

As described above, although one embodiment of the present disclosure is described, the present disclosure is not limited to the above embodiment, and various changes may be possible without departing from the spirit of the present disclosure. For example, the following change may be possible. Moreover, the concepts of the following modifications may suitably be combined.

<3-1>

Although the display processing of the above embodiment is applied to the radar device 1, it is also applicable to other devices, such as a fish finder and sonar.

<3-2>

In the above embodiment, when BIRD mode is selected, the echo image 51 of the short-distance range A1 and the echo image 51 of the long-distance range A2 may be generated in the ranges which do not overlap with each other. However, the screen generating module 31b may first generate the echo image 51 of the long-distance range A2 of a higher sensitivity and the echo image 51 of the short-distance range A1 of a lower sensitivity in the sizes of the respective display ranges based on the echo signal. Then, the portion corresponding to the short-distance range A1 may be extracted from the former echo image 51, and the portion corresponding to the long-distance range A2 may be extracted from the latter echo image 51. These partial echo images 51 may then be synthesized to generate the echo image 51 of the size of the display range. In this case, when the position of the bird ring L2 is changed by the user, the echo image 51 in which the change in the position is reflected immediately can easily be generated.

<3-3>

In the above embodiment, the sensitivity setting for the echo image 51 of the short-distance range A1 and the long-distance range A2 may be different for all of the gain, the video slope, and the color palette. However, only a part of these may be set separately. For example, the sensitivity setting of both the ranges A1 and A2 differs only for the gain, and it may be common for the video slope and the color palette. Moreover, the respective target to be set may be the echo signal.

<3-4>

In the above embodiment, the echo image 51 of the short-distance range A1 may be similar to that by the automatic setting in NORMAL mode, and is set to be always lower in the sensitivity than the echo image 51 of the long-distance range A2. Alternatively, the echo image 51 of the short-distance range A1 may be set to be higher in the sensitivity. For example, the echo image 51 of the short-distance range A1 may also be according to the setting of NORMAL mode immediately before the switching to BIRD mode. In this case, in the last NORMAL mode, when the parameters, such as the gain, are set manually, the echo image 51 of the short-distance range A1 may become higher in the sensitivity than the echo image 51 of the long-distance range A2.

<3-5>

In the above embodiment, the position of the bird ring L2 is changed according to the slide input by the user. However, the position of the bird ring L2 may be changed automatically according to a relation between the position specified by the user and the position of the ship. For example, the user may specify the position (for example, the latitude and the longitude) of the echo expected to be the bird displayed by the setting of the long-distance range A2. Then, as the ship moves toward the position of the echo expected to be the bird, that is, as the ship position approaches the position of the echo expected to be the bird, the radius of the bird ring L2 may be reduced. Therefore, the echo expected to be the bird can be continuously displaying by the setting of the long-distance range. Moreover, the position of the echo expected to be the bird may be automatically set, instead of being specified by the user. For example the echo from the bird may be automatically detected based on the echo image which changes for every scan, and the position of the echo may be set automatically.

<3-6>

In the above embodiment, the boundary between the short-distance range A1 and the long-distance range A2 is the circle like the bird ring L2. However, the boundary is not limited to the circle, and the center of the circle is not limited to the position of the ship. For example, the shape may be a sector or may be a rectangle. Moreover, the center may be located at an arbitrary position specified by the user. Note that, in this case, the short-distance range A1 may be interpreted as a selected area A1, and the long-distance range A2 as a non-selected area A2.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An echo image generating device, comprising:
processing circuitry configured to:
   acquire an echo signal from a target object around a ship;
   perform a first sensitivity setting for the echo signal in a first range, and a second sensitivity setting for the echo signal in a second range without including the first range, the second sensitivity setting being different from the first sensitivity setting; and
   generate an echo image of the first range based on the first sensitivity setting, and generate an echo image of the second range based on the second sensitivity setting,
wherein the processing circuitry assigns a video slope to the echo signal in the first range and assigns a different video slope to the echo signal or an echo trail in the second range.

2. The echo image generating device of claim 1, wherein the first range is a short-distance range located at a short distance from the ship, and the second range is a long-distance range located at a long distance from the ship, and wherein the processing circuitry sets the first sensitivity of the echo signal in the short-distance range lower than the second sensitivity of the echo signal in the long-distance range.

3. The echo image generating device of claim 2, wherein the processing circuitry sets a first gain for the echo signal in the first range, and a second gain higher than the first gain for the echo signal in the second range.

4. The echo image generating device of claim 2, wherein the processing circuitry generates a first echo image of a lower sensitivity and a second echo image of a higher sensitivity, based on the echo signal, and
wherein the echo image is generated by synthesizing a portion corresponding to the first range included in the first echo image, and a portion corresponding to the second range included in the second echo image.

5. The echo image generating device of claim 1, wherein the processing circuitry assigns a color palette to the echo signal in the first range and assigns a different color palette to the echo signal or an echo trail in the second range.

6. The echo image generating device of claim 1, wherein the first range is a circular range centering on a position of the ship, and the second range is a range adjacent to the first range and surrounding the first range from outside.

7. A radar device, comprising:
the echo image generating device of claim 1; and
a radar antenna configured to receive the echo signal.

8. An echo image generating device, comprising:
processing circuitry configured to:
acquire an echo signal from a target object around a ship;
perform a first sensitivity setting for the echo signal in a first range, and a second sensitivity setting for the echo signal in a second range without including the first range, the second sensitivity setting being different from the first sensitivity setting; and
generate an echo image of the first range based on the first sensitivity setting, and generate an echo image of the second range based on the second sensitivity setting,
wherein the processing circuitry places an indication of a position of the boundary between the first range and the second range on a screen including the echo image.

9. The echo image generating device of claim 8, wherein the processing circuitry places the indication on the screen both when the boundary is located inside a display range of the echo image, and when the boundary is located outside the display range.

10. The echo image generating device of claim 8, wherein the processing circuitry places a boundary line drawn along the boundary as the indication on the echo image.

11. The echo image generating device of claim 10, wherein the processing circuitry is further configured to change a position of the boundary according to an input by a user who slides the boundary line,
wherein when the position of the boundary is changed, the processing circuitry moves a position of the boundary line according to the position after the change of the position on the echo image.

12. The echo image generating device of claim 8, wherein the processing circuitry is further configured to change a position of the boundary according to an input by a user,
wherein when the position of the boundary is changed, the processing circuitry changes the indication according to the position after the change of the position.

13. The echo image generating device of claim 8, wherein the processing circuitry is further configured to automatically change a position of the boundary based on a position inputted by a user and a position of the ship,
wherein when the position of the boundary is changed, the processing circuitry changes the indication according to the position after the change of the position.

14. A method of generating an echo image, comprising the steps of:
acquiring an echo signal from a target object around a ship;
performing a first sensitivity setting for the echo signal in a first range and a second sensitivity setting for the echo signal in a second range without including the first range, the second sensitivity setting being different from the first sensitivity setting;
generating an echo image of the first range based on the first sensitivity setting and generating an echo image of the second range based on the second sensitivity setting; and
placing an indication of a position of the boundary between the first range and the second range on a screen including the echo image.

* * * * *